United States Patent
Seok

(10) Patent No.: US 8,665,844 B2
(45) Date of Patent: Mar. 4, 2014

(54) DIRECT LINK SETUP METHOD IN TUNNELED DIRECT LINK SETUP (TDLS) WIRELESS NETWORK

(75) Inventor: Yong Ho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 355 days.

(21) Appl. No.: 13/122,725

(22) PCT Filed: Jun. 30, 2009

(86) PCT No.: PCT/KR2009/003548
§ 371 (c)(1),
(2), (4) Date: Apr. 5, 2011

(87) PCT Pub. No.: WO2010/044533
PCT Pub. Date: Apr. 22, 2010

(65) Prior Publication Data
US 2011/0228755 A1      Sep. 22, 2011

Related U.S. Application Data

(60) Provisional application No. 61/105,428, filed on Oct. 15, 2008.

(30) Foreign Application Priority Data

Dec. 30, 2008   (KR) .......................... 10-2008-0136852

(51) Int. Cl.
*H04W 4/00* (2009.01)
(52) U.S. Cl.
USPC ........................................................ 370/338
(58) Field of Classification Search
USPC .................................. 370/338, 331
See application file for complete search history.

(56) References Cited

U.S. PATENT DOCUMENTS

| | | | | |
|---|---|---|---|---|
| 6,088,591 A * | 7/2000 | Trompower et al. | ........... | 455/438 |
| 7,251,235 B2 * | 7/2007 | Wentink | ........................ | 370/338 |
| 7,904,534 B2 * | 3/2011 | Lobbert | ........................ | 709/220 |
| 8,064,374 B2 * | 11/2011 | Kakani et al. | ................. | 370/311 |
| 8,149,800 B2 * | 4/2012 | Sawada | ........................ | 370/338 |
| 8,284,708 B2 * | 10/2012 | Kneckt et al. | ................. | 370/311 |
| 8,310,978 B2 * | 11/2012 | Itagaki et al. | ................. | 370/315 |
| 8,358,638 B2 * | 1/2013 | Scherzer et al. | ............. | 370/338 |
| 2003/0231608 A1 | 12/2003 | Wentink | | |
| 2004/0029590 A1 | 2/2004 | Wentink | | |
| 2005/0053015 A1 * | 3/2005 | Jin et al. | ........................ | 370/254 |
| 2005/0122927 A1 * | 6/2005 | Wentink | ........................ | 370/311 |
| 2006/0165035 A1 | 7/2006 | Chandra et al. | | |
| 2007/0042787 A1 * | 2/2007 | Hsu et al. | ........................ | 455/450 |
| 2007/0104138 A1 | 5/2007 | Rudolf et al. | | |
| 2007/0286209 A1 * | 12/2007 | Wang et al. | .............. | 370/395.54 |
| 2008/0031209 A1 * | 2/2008 | Abhishek et al. | ............. | 370/338 |
| 2008/0069047 A1 * | 3/2008 | Yee et al. | ........................ | 370/331 |
| 2009/0231995 A1 * | 9/2009 | Chu et al. | ........................ | 370/225 |
| 2011/0158110 A1 * | 6/2011 | Stacey et al. | ................. | 370/252 |

* cited by examiner

Primary Examiner — Ricky Ngo
Assistant Examiner — Ben H Liu
(74) *Attorney, Agent, or Firm* — Lee, Hong, Degerman, Kang & Waimey

(57) ABSTRACT

According to embodiments of the present invention, there is provided a direct link setup method in a tunneled direct link setup (TDLS) wireless communication system. The method including: an initiator QSTA acquiring medium access control (MAC) address information of a peer quality of service station (QSTA); transmitting a TDLS setup request frame comprising the MAC address information to the peer QSTA; receiving a TDLS setup response frame in response to the TDLS setup request frame to the initiator QSTA from the peer QSTA; and transmitting a TDLS setup confirm frame in response to the TDLS setup response frame to the peer QSTA.

4 Claims, 3 Drawing Sheets

| MAC Header | LLC/SNAP | TDLS Type | Information | CRC |
|---|---|---|---|---|
| Octets: variable | 8 | 1 | variable | 4 |

| MAC Header | LLC/SNAP | TDLS Type | Information | CRC |
|---|---|---|---|---|
| Octets: variable | 8 | 1 | variable | 4 |

| Element ID | Length | BSSID | TDLS initiator Address | Peer STA Address |
|---|---|---|---|---|
| Octets: 1 | 1 | 6 | 6 | 6 |

Fig. 6

| Order | Information | Notes |
|---|---|---|
| 1 | Link Identifier | The Link Identifier is specified in 7.3.2.z1. |
| 2 | Dialog Token | The Dialog Token contains a unique value for this conversation |
| 3 | Trigger MAC Address | MAC Address of TDLS Setup Trigger Initiating STA |
| 4 | Trigger ID | ID Number of TDLS Setup Trigger Filter |
| 5 | Trigger TCLAS | TCLAS IE which specifies the traffic class for initiating TDLS Setup |

DIRECT LINK SETUP METHOD IN TUNNELED DIRECT LINK SETUP (TDLS) WIRELESS NETWORK

CROSS-REFERENCE TO RELATED APPLICATIONS

This application is the National Stage filing under 37 U.S.C. 371 of International Application No. PCT/KR2009/003548, filed on Jun. 30, 2009, which claims the benefit of earlier filing date and right of priority to Korean Patent Application No. 10-2008-0136852, filed on Dec. 30, 2008, and also claims the benefit of U.S. Provisional Application Ser. No. 61/105,428, filed on Oct. 15, 2008, the contents of which are all hereby incorporated by reference herein in their entirety.

TECHNICAL FIELD

The present invention relates to a wireless local area network (WLAN), and more particularly, to a direct link setup procedure in a tunneled direct link setup (TDLS) wireless network.

BACKGROUND ART

With the advance of an information communication technology, various wireless communication technologies have been developed. Among them, a wireless local area network (WLAN) allows wireless Internet access in a specific service area (e.g., home, businesses, aircraft, etc.) by using a portable terminal on the basis of a radio frequency technique. Examples of the portable terminal include a personal digital assistant (PDA), a laptop computer, a portable multimedia player (PMP), etc.

Recently, with the increasing availability of WLAN facilities, users of a portable terminal such as a laptop computer can perform their works with improved mobility. For example, the users can participate in a business meeting by carrying their laptop computers from their desks to the place where the business meeting is held. In this case, the users can still read data or the like while maintaining access to a local network. In addition, even if a wired connection is not provided, the users can access to the Internet through a gateway or one or more modems equipped in the local network. Likewise, business travelers can access to their e-mail addresses by using their portable terminals without any particular difficulties to read received e-mails or to write and send e-mails.

In the initial WLAN technology, a frequency of 2.4 GHz is used according to the institute of electrical and electronics engineers (IEEE) IEEE 802.11 to support a data rate of 1 to 2 Mbps by using frequency hopping, spread spectrum, infrared ray communication, etc. With the recent development of the wireless communication technology, an orthogonal frequency division multiplex (OFDM) technique or the like is applied to the WLAN in order to support a data rate of up to 54 Mbps. In addition, the IEEE 802.11 has developed and commercialized a wireless communication technology or has currently being developing the wireless communication system. Examples of the wireless communication technology include quality of service (QoS) improvement, access point (AP) protocol compatibility, security enhancement, radio resource measurement, wireless access in vehicular environments, fast roaming, mesh networks, inter-working with external networks, wireless network management, etc.

In the IEEE 802.11, a basic service set (BSS) is a set of stations (STAs) successfully synchronized. In addition, a basic service area (BSA) is an area containing members of the BSS. The BSA may vary depending on a propagation property of a wireless medium. Thus, a boundary of the BSA is ambiguous to some extent. The BSS can be classified into an independent BSS (IBSS) and an infra-structured BSS. The IBSS constitutes a self-contained network and is not allowed to access a distribution system (DS). The infra-structured BSS includes one or more APs, DSs, etc., and generally uses the APs in all communication processes including communication between STAs.

In the initial WLAN communication procedure, it is required that data must be transmitted through the AP in the infra-structured BSS while not allowing direct data transmission between non-AP STAs. Recently, however, a direct link setup (DLS) between the non-AP STAs is supported to improve efficiency of wireless communication (e.g., IEEE 802.11e). Accordingly, in a BSS supporting QoS, i.e., in a QoS BSS (QBSS) including a QoS STA (QSTA) and a QoS AP (QAP), non-AP STAs can set up a direct link and perform direct communication not through the QAP but through the direct link.

A DLS protocol in an IEEE 802.11e WLAN environment is based on the premise that the BSS is the QBSS supporting QoS. In the QBSS, not only the non-AP STA but also the AP is a QAP (i.e., an AP supporting QoS). However, in most of currently available WLAN environments (e.g., IEEE 802.11a/b/g WLAN environment), the AP is a legacy AP not supporting QoS even if the non-AP STA is a QSTA (i.e., a STA supporting QoS). As a result, in the currently available WLAN environments, there is such a limitation in that even the QSTA cannot use a DLS service.

A tunneled direct link setup (TDLS) is a wireless communication protocol newly proposed to overcome the limitation above. The TDLS is proposed to allow QSTAs to set up a direct link in the currently available IEEE 802.11a/b/g WLAN environment not supporting QoS. In addition, the TDLS is proposed to enable a direct link setup even in a power save mode (PSM). Therefore, the TDLS defines all procedures or methods for allowing the QSTAs to set up the direct link even in a BSS managed by the legacy AP. A wireless network supporting the TDLS will be hereinafter referred to as a TDLS wireless network.

In the TDLS wireless network, a direct link setup method between two non-AP QSTAs needs to be defined first in detail. This is because, unlike in the IEEE 802.11e wireless network, the TDLS wireless network cannot allow an AP not supporting QoS to be directly involved in the direct link setup method between the non-AP QSTAs. In particular, to set up the direct link, a message for the direct link setup has to be exchanged between the non-AP QSTAs, and specific information on a peer non-AP QSTA, for example, a medium access control (MAC) address of the peer non-AP QSTA, is required. However, these requirements are not defined in detail in the DLS link setup procedure specified in the IEEE 802.11e or in a TDLS link setup procedure proposed up to now.

DISCLOSURE OF INVENTION

Technical Problem

The present invention provides a direct link setup procedure in a tunneled direct link setup (TDLS) wireless network in which completion of setting up of a direct link can be consistent between two non-access point (AP) quality of service stations (QSTAs) each intending to set up the direct link and in which the setting up of the direct link between the two non-AP QSTAs can be supported even if an AP performs a proxy address resolution protocol (ARP) operation.

Technical Solution

According to an aspect of the present invention, there is provided a direct link setup method in a tunneled direct link setup (TDLS) wireless communication system, including: an initiator QSTA acquiring medium access control (MAC) address information of a peer quality of service station (QSTA); transmitting a TDLS setup request frame comprising the MAC address information to the peer QSTA; receiving a TDLS setup response frame in response to the TDLS setup request frame to the initiator QSTA from the peer QSTA; and transmitting a TDLS setup confirm frame in response to the TDLS setup response frame to the peer QSTA.

According to another aspect of the present invention, there is provided an address resolution protocol (ARP) procedure in a wireless local area network (WLAN) system, including: a user equipment transmitting information indicating the use of a proxy ARP to an access point; and upon receiving an ARP request message from the user equipment, the access point transmitting a response message to the user equipment by using the proxy ARP procedure according to a value set in the information or delivering the received ARP request message to a target user equipment by the access point.

Advantageous Effects

According to embodiments of the present invention, an initiator quality of service station (QSTA) can acquire medium access control (MAC) address information of a peer QSTA before a tunneled direct link setup (TDLS) setup request frame is transmitted. Therefore, the initiator QSTA can set a MAC address of the peer QSTA in a link identifier information element (IE) of the TDLS setup request frame, and thus can smoothly perform a direct link setup procedure.

BRIEF DESCRIPTION OF DRAWINGS

FIG. 6 is a table showing an exemplary format of a TDLS setup trigger frame.

MODE FOR THE INVENTION

Figures 1, 2, 3:
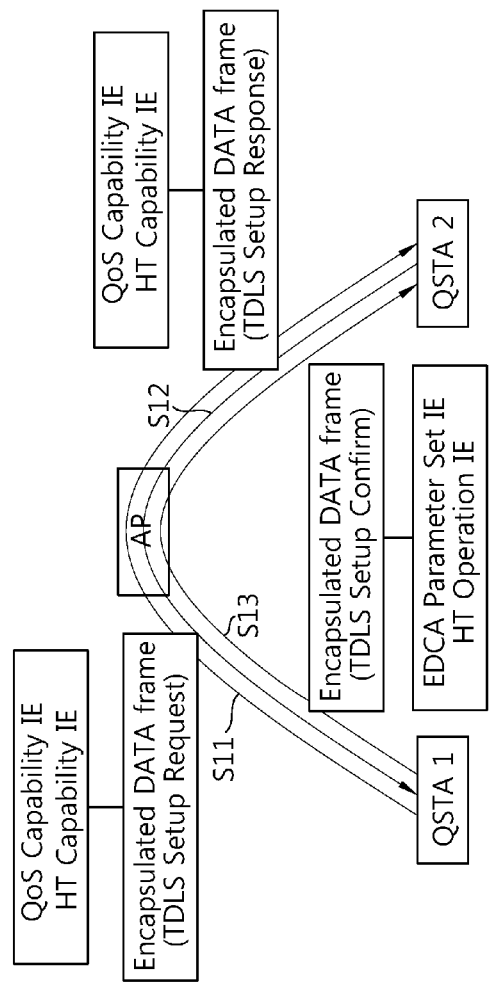
FIG. 1 is a diagram showing an exemplary format of a management action frame (also referred to as a 'tunneled direct link setup (TDLS) frame') encapsulated in the format of a data frame in a TDLS wireless network.
FIG. 2 is a diagram showing a format of a link identifier information element (IE).
FIG. 3 is a message flow diagram showing an example of a direct link setup method in a TDLS wireless network.

Among elements constituting a tunneled direct link setup (TDLS) wireless network system, a non-access point (AP) station (STA) is an arbitrary device including a medium access control (MAC) conforming to the institute of electrical and electronics engineers (IEEE) 802.11 standard and a physical layer interface for a wireless medium. The non-AP STA is a wireless device other than an AP, and can also be referred to as a wireless transmit/receive unit (WTRU), a user equipment (UE), a mobile station (MS), a mobile subscribed unit, etc. A non-AP STA supporting a quality of service (QoS) is referred to as a non-AP QSTA or simply a QSTA.

The non-AP STA includes a processor and a transceiver. In general, the non-AP STA may further include a user interface and a display means. The processor is a functional unit designed to generate a frame to be transmitted through a wireless network or to process a frame received through the wireless network. The processor controls STAs and processes various signals input by and for a user. The transceiver functionally connected to the processor is a functional unit designed to transmit and receive a frame through the wireless network for the STAs.

An AP is a functional entity designed to have a function of a wireless device and to access a distribution system (DS) through the wireless medium for an association STA. According to an embodiment of the present invention, the AP may be a legacy AP not supporting QoS, but the present invention is not limited thereto. The AP may also be referred to as a centralized controller, a base station (BS), a node-B, a site controller, etc.

In a TDLS wireless network according to the embodiment of the present invention, even a non-AP QSTA (or simply referred to as 'QSTA') associated with a legacy AP not supporting QoS can set up a direct link therebetween and tear down the set-up direct link. In order for one QSTA to set up a direct link with another QSTA or to tear down a direct link with a peer QSTA, management action frames for setting up or tearing down the direct link need to be exchanged through the legacy AP. However, there is a problem in that the legacy AP cannot be directly involved in allowing two QSTAs to set up a direct link or to tear down the set-up direct link according to the conventional DLS procedure.

One method for solving the above problem is to encapsulate the management action frames in association with the direct link in the format of a data frame and to transmit the encapsulated management action frames to the peer QSTA. Accordingly, similarly to a case where the data frame is relayed between two non-AP STAs, the legacy AP performs only a function of relaying the transmitted management action frames. As a result, the legacy AP is not involved in all procedures of setting up, managing, and tearing down a TDLS link. The embodiment of the present invention to be described below can be usefully applied to a TDLS wireless network in which the management action frames for setting up, tearing down, and managing the TDLS link are encapsulated in the format of a data frame and exchanged through an AP. Herein, the AP is not limited to the legacy AP, and thus may be a QAP supporting TDLS.

FIG. 1 is a diagram showing an exemplary format of a management action frame (hereinafter, referred to as a 'TDLS frame') encapsulated in the format of a data frame in a TDLS wireless network. Referring to FIG. 1, the TDLS frame includes a MAC header field, a logical link control (LLC)/sub-network access protocol (SNAP) field, a TDLS type field, an information field, and a cyclic redundancy code (CRC) field.

The MAC header field includes information common to almost all types of frames. For example, the MAC header field may include a frame control field, a duration/identifier (ID) field, a plurality of address fields (i.e., Address1, Address2, Address3, and Address4), a sequence control field, and/or a QoS control field. The LLC/SNAP field includes an LLC/SNAP header, and has an Ether type that can be set to a value different from that of a conventional data frame. The value set in the LLC/SNAP field informs whether a data frame is a TDLS frame. The TDLS packet type field is set to a value for specifying a type of the TDLS frame. The TDLS frame has various types such as a TDLS setup request frame, a TDLS setup response frame, a TDLS setup confirm frame, a TDLS teardown request frame, a TDLS teardown response frame, etc.

The information field of the TDLS frame includes a variety of information individually specified depending on each TDLS frame type. Information included in the information field varies depending on each TDLS type. In case of the TDLS setup request frame, the information field of the TDLS frame includes at least link identifier information.

FIG. 2 is a diagram showing a format of a link identifier information element (IE). Referring to FIG. 2, the link identifier IE includes an element ID field, a length field, a basic service set (BSS) ID field, a TDLS initiator address field, and a peer STA address field. The element ID field is set to a specific value indicating the link identifier IE. The length field is set to a specific value indicating a length of subsequent fields in an octet unit. The BSS ID field is set to a value identifying a BSS associated with a QSTA.

The TDLS initiator address field is set to a specific value indicating a MAC address of a QSTA transmitting the TDLS setup request frame. The peer STA address field is set to a specific value indicating a MAC address of a QSTA (i.e., the peer QSTA) with which a direct link is set up. Therefore, to set up the direct link in a TDLS wireless network, a QSTA requesting the setting up of the direct link has to know the MAC address of the peer QSTA in advance. Hereinafter, together with the TDLS frame having the format of FIG. 1, a direct link setup procedure in the TDLS wireless network by using the TDLS setup request frame including the link identifier information of FIG. 2 will be described in brief.

FIG. 3 is a message flow diagram showing an example of a direct link setup method in a TDLS wireless network. A TDLS wireless network system includes at least two non-AP QSTAs (hereinafter, simply referred to as 'QSTA') and a legacy AP not supporting QoS.

Referring to FIG. 3, a QSTA 1 (i.e., a TDLS initiator) intending to set up a direct link with a QSTA 2 (i.e., a peer STA) transmits a request message for requesting the setting up of the direct link, for example, a TDLS setup request frame, to the QSTA 2 through an AP (step S11). In this step, the AP simply relays the TDLS setup request frame. The TDLS setup request frame may be a frame in which the TDLS packet type field of the TDLS frame of FIG. 1 is set to a value indicating a TDLS setup request. The TDLS setup request frame includes the link identifier information of FIG. 2.

The QSTA 2 transmits a response message in response to the received TDLS setup request frame, for example, a TDLS setup response frame, to the QSTA 1 also through the AP (step S12). In this step, the AP also simply relays the TDLS setup response frame. The TDLS setup response frame may be a frame in which the TDLS packet type field of the TDLS frame of FIG. 1 is set to a value indicating a TDLS setup response. Therefore, the TDLS setup response frame is encapsulated in the format of a data frame and is transmitted to the QSTA 1 through the AP.

Subsequently, the QSTA 1 transmits a confirm message for the received TDLS setup response frame, for example, a TDLS setup confirm frame, to the QSTA 2 through the AP (step S13). In this step, the AP also simply relays the TDLS setup confirm frame. The TDLS setup confirm frame may be a frame in which the TDLS packet type field of the TDLS frame of FIG. 1 is set to a value indicating a TDLS setup confirm. The TDLS setup confirm frame is encapsulated in the format of a data frame and is transmitted to the QSTA 2 through the AP.

Step S13 is additionally provided in the direct link setup method of FIG. 3 unlike in the direct link setup procedure of the IEEE 802.11e QBSS. That is, in the direct link setup method of FIG. 3, the QSTA 1 requesting the setting up of the direct link transmits to the QSTA 2 a confirm message indicating that the response message received from the QSTA is successfully received, and thereafter the direct link setup method is completed. Accordingly, when the AP fails to transmit a management action frame (e.g., the TDLS setup response frame), which is transmitted after being encapsulated in the format of a data frame, the QSTA 1 and the QSTA 2 can consistently recognize completion of the direct link setup method.

The direct link setup method of FIG. 3 is based on the premise that the initiator QSTA (i.e., the QSTA 1) knows a MAC address of the peer QSTA (i.e., the QSTA 2). This is because the TDLS setup request frame includes the link identifier information, and the link identifier IE includes the peer STA address field for determining the MAC address of the peer STA. However, according to an association procedure, a network management procedure, or the like in a current TDLS wireless network, one QSTA cannot know MAC addresses of other QSTAs belonging to the same BSS. Therefore, in order to support the direct link setup procedure in the TDLS wireless network, there is a need for a procedure in which the initiator QSTA of the direct link setup procedure knows the MAC address of the peer QSTA.

In general, a UE 1 (e.g., the initiator QSTA) using a transmission control protocol/Internet protocol (TCP/IP) uses an address resolution protocol (ARP) to know a MAC address of a UE 2 (i.e., the peer QSTA) located in the same sub-network. According to the ARP, the UE 1 initially broadcasts an ARP request message. The ARP request message includes a MAC address and an IP address of the UE 1, and also includes an IP address of a target UE (i.e., the UE 2). UEs receiving the ARP request message compare their IP addresses with the IP address of the target UE specified in the ARP request message. If their IP addresses are identical to the IP address of the target UE specified in the ARP request message, the UEs transmit an ARP response message to the UE 1 by adding their MAC addresses to the ARP response message. According to this procedure, the UE 1 can know the MAC address of the target UE (i.e., the UE 2) receiving the ARP response message.

However, the initiator QSTA cannot know the MAC address of the peer QSTA even if the ARP procedure is directly applied to the TDLS wireless network. This is because a proxy ARP is used in the AP to prevent the ARP request message from being broadcast in a WLAN environment. When using the proxy ARP, the AP does not broadcast the ARP request message through a wireless link upon receiving the ARP request message. Rather, instead of the target UE, the AP transmits the ARP response message. That is, since the AP knows the MAC address of the target UE, the AP transmits the ARP response message by setting the MAC address of the AP in a field for specifying the MAC address of the target UE while not broadcasting the ARP request message.

Figure 4:
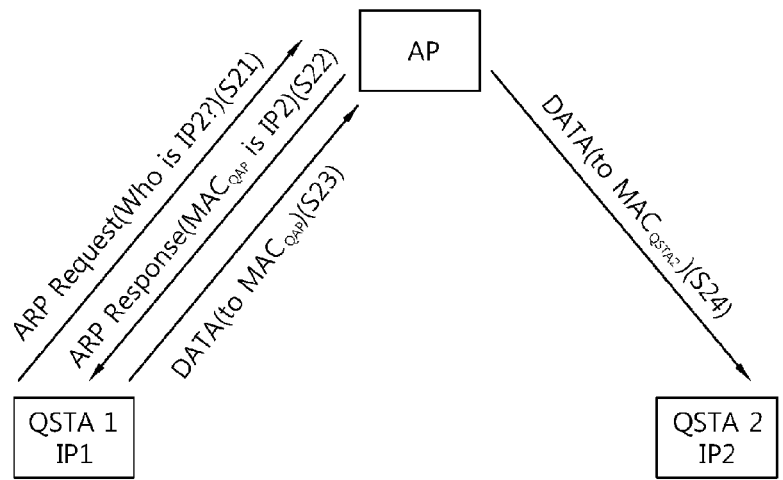
FIG. 4 is a message flow diagram showing an address resolution protocol (ARP) procedure and a subsequent data frame transmission procedure in a quality of service basic service set (QBSS) wireless local area network (WLAN) system.

FIG. 4 is a message flow diagram showing an ARP procedure and a subsequent data frame transmission procedure in a QBSS WLAN system.

In the QBSS WLAN system, a QSTA 1 knowing an IP address of a target UE (i.e., a QSTA 2) has to know a MAC address of the QSTA 2 to transmit data to the QSTA 2. For this, according to the ARP, the QSTA 1 broadcasts an ARP request message (step S21). When in an infra-structured BSS mode, a broadcast message of a QSTA is delivered to a QAP in a unicast manner, and the broadcast message is broadcast by the QAP. However, according to the proxy ARP, the QAP knowing the MAC address of the QSTA 2 transmits an ARP response message directly to the QSTA 1 instead of broadcasting the received ARP request message (step S22). In this case, the ARP response message includes not the MAC address of the QSTA 2 but a MAC address of a device (i.e., the QAP) transmitting the ARP response message. When the QSTA 1 transmits a data frame or the like to the QSTA 2 after receiving MAC address information of the target UE, the QSTA 1 determines the QAP's MAC address included in the ARP response message as the MAC address of the target UE and then transmits the determined MAC address (step S23). The QAP transmits the received data frame to the actual target UE (i.e., the QSTA 2) (step S24).

According to the ARP procedure, when an AP uses the proxy ARP, the QSTA 1 cannot know an actual MAC address of the target UE (i.e., the QSTA 2). Therefore, the QSTA 1 not knowing the MAC address of the QSTA 2 cannot set up a direct link with the QSTA 2. However, even if the AP uses the proxy ARP and thus an initiator UE cannot know the MAC address of the target UE, the direct link may need to be set up in a TDLS wireless network.

In the direct link setup method of the TDLS wireless network according to the embodiment of the present invention, the proxy ARP procedure is partially modified so that the initiator UE can know the MAC address of the target UE even if the AP uses the proxy ARP procedure.

One modified proxy ARP procedure allows the AP to deliver the received ARP request message through the wireless link instead of directly transmitting the ARP response message in which the MAC address of the AP is set, when the AP receives the ARP request message from the initiator UE through the wireless link. The modified proxy ARP procedure can be allowed only when the target UE is associated with the same BSS. The AP can transmit the ARP request message in a unicast or broadcast manner for the target UE. Unicast transmission is preferable to prevent the ARP request message from being broadcast through the wireless link. Upon receiving the ARP request message, the target UE transmits to the initiator UE the ARP response message including the MAC address of the target UE. The initiator UE can acquire the MAC address of the target UE upon receiving the ARP response message.

Another modified proxy ARP procedure is the same as the previous procedure in that it allows the AP to transmit the ARP response message to the initiator UE when the AP receives the ARP request message from the initiator UE through the wireless link. However, a difference of the modified proxy ARP procedure lies in that the AP does not add the MAC address of the AP to the ARP response message but adds the MAC address of the target UE to the ARP response message. According to the modified proxy ARP procedure, the initiator UE can recognize the MAC address of the target UE by receiving the ARP response message.

Still another modified proxy ARP procedure allows a UE supporting the setting up of the direct link to determine whether the AP provides a proxy ARP service or a normal ARP service. The initiator QSTA indenting to set up the direct link can request the AP to stop the proxy ARP service provided for the initiator QSTA so as to acquire the MAC address of the peer QSTA. Upon receiving the request of stopping the proxy ARP service, the AP always delivers the received ARP request message to the target UE (i.e., the peer QSTA) without using the proxy ARP for the UE (i.e., the initiator UE) receiving the request.

According to the embodiment of the present invention, there is no particular restriction when the UE supporting the setting up of the direct link determines whether the AP provides the proxy ARP service or the normal ARP service and then reports the determination result. For example, a frame having a new format may be generated to indicate determination of the UE, an information element (IE) having a new format may be generated to be used, or a new field may be added to a previous IE.

As one example, the proxy ARP field in extended capability information is used. That is, the UE can use the proxy ARP field of the extended capability information to request the proxy ARP service or to request to stop the use of the proxy ARP service. For example, if the proxy ARP field is set to '1' in the extended capability information, the AP can provide the proxy ARP service to the UE. If the UE sets the proxy ARP field to '0' in the extended capability information, the AP can stop the proxy ARP service provided to the UE and can deliver the received ARP request message to the target UE. In this example, '0' and '1' are arbitrarily set, and thus may be set the other way around.

The aforementioned several types of the modified proxy ARP procedures require that the AP must be a device supporting the procedure. That is, there is a limitation in that the direct link setup procedure using the modified proxy ARP procedure cannot be applied when the AP supports the conventional proxy ART procedure. Many commercialized APs support only the conventional proxy ARP procedure, and there is a limitation in the use of the direct link setup procedure using the modified ARP procedure.

To overcome the limitation in the use of the modified proxy ARP procedure, the direct link setup procedure according to the embodiment of the present invention proposes a triggered direct link setup procedure. In the triggered direct link setup procedure, a specific frame (e.g., a TDLS setup trigger frame) is initially broadcast so that the initiator QSTA knows the MAC address of the peer QSTA upon transmitting the TDLS setup request frame. The TDLS setup trigger frame includes MAC address information of a QSTA transmitting the TDLS setup trigger frame. The initiator QSTA directly performs the conventional TDLS setup procedure by using the peer QSTA's MAC address information included in the TDLS setup trigger frame. Hereinafter, the triggered TDLS setup procedure will be described with reference to FIG. 5.

Figure 5:
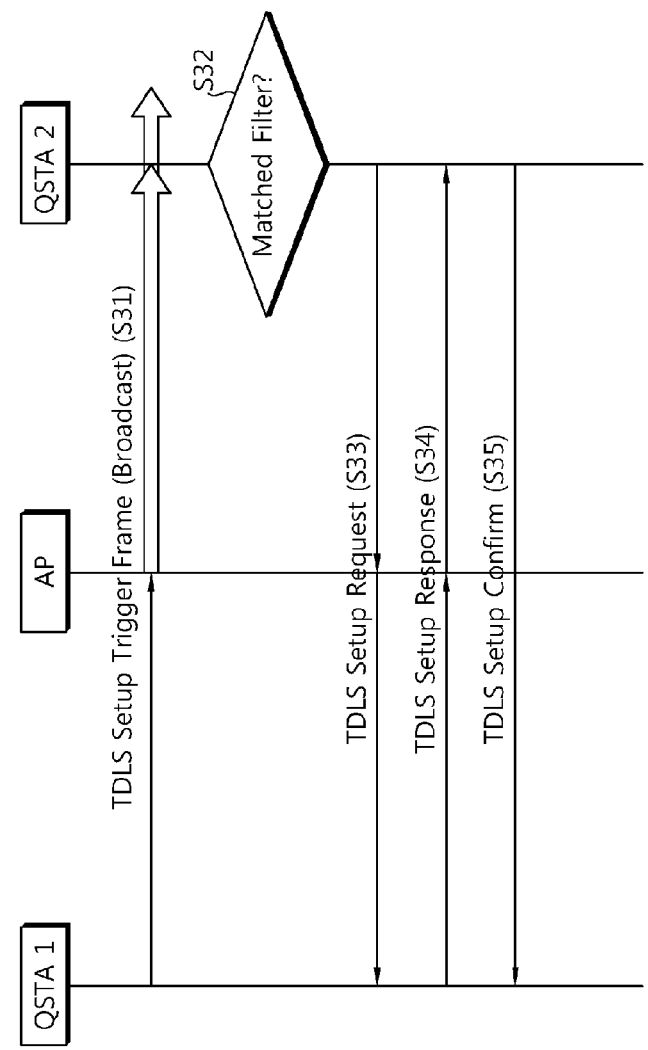
FIG. 5 is a flow diagram showing a triggered TDLS setup method according to an embodiment of the present invention.

Referring to FIG. 5, a QSTA (i.e., a QSTA 1) intending to set up a direct link with another QSTA initially broadcasts a TDLS setup trigger frame (step S31). The TDLS setup trigger frame broadcast by the QSTA 1 is delivered to a legacy AP in a unicast manner. The legacy AP can broadcast the received TDLS setup trigger frame. The TDLS setup trigger frame includes MAC address information of a UE (i.e., the QSTA 1) initially transmitting the TDLS setup trigger frame. The TDLS setup trigger frame may also include trigger ID information and/or trigger traffic class (TCLAS) information.

An exemplary format of the TDLS setup trigger frame is shown in a table of FIG. 6. Referring to FIG. 6, the TDLS setup trigger frame includes link identifier information, dialog token information, trigger MAC address information, trigger ID information, and trigger TCLAS information.

The MAC address information of the UE initially transmitting the TDLS setup trigger frame may be included in a specific field of the TDLS setup trigger frame, for example, in a trigger MAC address field. That is, the trigger MAC address field is set to the MAC address of the UE transmitting the TDLS setup trigger frame. The trigger ID field indicates an ID number indicating a TDLS setup trigger filter, and is used to identify each of a plurality of TDLS setup trigger frames. The trigger ID field may increase whenever the trigger TCLAS field is modified. The trigger TCLAS field indicates a TCLAS IE for a traffic condition that requires a TDLS setup, and may be referred to as other terms, e.g., a TDLS TCLAS IE. Upon receiving the broadcast TDLS setup trigger frame, the UE can use a value set in the trigger TCLAS IE to determine whether the UE has to transmit a response.

Referring again to FIG. 5, UEs receiving the TDLS setup trigger frame register a specific filter consisting of values set in the TDLS setup trigger frame (i.e., a TDLS setup trigger filter consisting of the trigger MAC address, the trigger ID, and the trigger TCLAS) to the TDLS setup trigger table. Further, the UEs determine whether received traffic is matched to the trigger TCLAS of the TDLS setup trigger field registered in the TDLS setup trigger table (step S32). If a matched filter exists, the TDLS setup starts by using the trigger MAC address (steps S33 to S35). There is no particular restriction on the direct link setup procedure performed in steps S33 to step S35, which may be the same as the conventional direct link setup procedure. For example, the TDLS setup request frame, the TDLS setup response frame, and the TDLS confirm frame may be exchanged between the QSTA 2 and the QSTA 1.

To overcome the limitation in the use of the modified proxy ARP procedure, the direct link setup procedure according to another embodiment of the present invention proposes a triggered direct link setup procedure in which the initiator QSTA transmits the TDLS setup request frame in a broadcast manner instead of a unicast manner. In this case, the initiator QSTA does not have to set the MAC address of the peer QSTA to the link identifier IE of the TDLS setup request frame. The initiator QSTA may add the trigger TCLAS field to the TDLS setup request frame so as to specify a TCLAS IE for a traffic condition that requires the TDLS setup. According to the embodiment of the present invention, upon receiving the broadcast TDLS setup request frame including the trigger TCLAS field, the UE can use a value set in the trigger TCLAS IE of the received frame to determine whether the UE has to transmit a response.

According to the embodiment of the present invention, the QSTA initiating the direct link setup procedure in the TDLS wireless network can initiate the direct link setup procedure even if the MAC address information of the peer QSTA is not known.

The TDLS wireless network according to the embodiment of the present invention is based on the premise that a QSTA can use an ARP to know a MAC address of a QSTA located in the same sub-network. However, if the conventional ARP procedure is directly applied to the TDLS wireless network, the QSTA cannot know the MAC address of the peer QSTA. Thus, in the direct link setup procedure in the TDLS wireless network according to the embodiment of the present invention, the QSTA may use the modified ARP procedure, or a new operation is further provided to know the MAC address of the peer QSTA.

While the present invention has been particularly shown and described with reference to exemplary embodiments thereof, it will be understood by those skilled in the art that various changes in form and details may be made therein without departing from the spirit and scope of the invention as defined by the appended claims.

The invention claimed is:

1. A method for setting up a tunneled direct link setup (TDLS) link in a wireless communication system, the method comprising:

receiving, by an initiating station, a TDLS setup trigger frame from a responding station to discover TDLS capable stations in a same basic service set, the TDLS setup trigger frame including trigger address information, the trigger address information indicating a medium access control (MAC) address of the responding station;

transmitting, by the initiating station, a TDLS setup request frame to the responding station to establish a TDLS direct link, the TDLS setup request frame comprising address information indicating the MAC address of the responding station;

receiving, by the initiating station, a TDLS setup response frame from the responding station in response to the TDLS setup request frame; and transmitting, by the initiating station, a TDLS setup confirm frame to the responding station in response to the TDLS setup response frame, wherein:

the TDLS setup trigger frame is received directly from the responding station;

the TDLS setup request frame and the TDLS setup response frame are transmitted or received via an access point as encapsulated data frames;

the TDLS setup trigger frame further includes first information and second information;

the first information is used for the initiating station to identify the TDLS setup trigger frame; and the second information is used to determine whether the initiating station initiates a TDLS request with the responding station.

2. The method of claim 1, wherein the TDLS setup trigger frame is not received via the access point.

3. A device configured for setting up a tunneled direct link setup (TDLS) link in a wireless communication system, the device comprising:

a transceiver; and a processor operatively coupled with the transceiver and configured to:

receive, via the transceiver, a TDLS setup trigger frame from a responding station to discover TDLS capable stations in a same basic service set, the TDLS setup trigger frame including trigger address information, the trigger address information indicating a medium access control (MAC) address of the responding station;

transmit, via the transceiver, a TDLS setup request frame to the responding station to establish a TDLS direct link, the TDLS setup request frame comprising address information indicating the MAC address of the responding station;

receive, via the transceiver, a TDLS setup response frame from the responding station in response to the TDLS setup request frame; and transmit, via the transceiver, a TDLS setup confirm frame to the responding station in response to the TDLS setup response frame, wherein:

the TDLS setup trigger frame is received directly from the responding station;

the TDLS setup request frame and the TDLS setup response frame are transmitted or received via an access point as encapsulated data frames;

the TDLS setup trigger frame further includes first information and second information;

the first information is used to identify the TDLS setup trigger frame; and the second information is used to determine whether the device initiates a TDLS request with the responding station.

4. The device of claim 3, wherein the TDLS setup trigger frame is not received via the access point.

* * * * *